United States Patent
Pierquet et al.

(10) Patent No.: US 10,873,221 B1
(45) Date of Patent: Dec. 22, 2020

(54) WIRELESS POWER CONTROL SYSTEM

(71) Applicant: Apple Inc., Cupertino, CA (US)

(72) Inventors: Brandon Pierquet, San Francisco, CA (US); Hunter H. Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 235 days.

(21) Appl. No.: 15/866,271

(22) Filed: Jan. 9, 2018

Related U.S. Application Data

(60) Provisional application No. 62/452,877, filed on Jan. 31, 2017.

(51) Int. Cl.
*H02J 50/80* (2016.01)
*H02J 7/00* (2006.01)
*H02J 7/02* (2016.01)
*H02J 50/05* (2016.01)

(52) U.S. Cl.
CPC ............ *H02J 50/80* (2016.02); *H02J 7/0091* (2013.01); *H02J 7/025* (2013.01); *H02J 50/05* (2016.02)

(58) Field of Classification Search
CPC .............. H02J 50/05; H02J 50/00; H04B 5/00
USPC .......................................................... 307/104
See application file for complete search history.

(56) References Cited

U.S. PATENT DOCUMENTS

| | | | | |
|---|---|---|---|---|
| 6,437,302 B1* | 8/2002 | Bowers | ................... | H05B 6/06 |
| | | | | 219/661 |
| 2009/0243397 A1* | 10/2009 | Cook | ..................... | H02J 5/005 |
| | | | | 307/104 |
| 2011/0053500 A1 | 3/2011 | Menegoli et al. | | |
| 2012/0112534 A1 | 5/2012 | Kesler et al. | | |
| 2013/0093254 A1* | 4/2013 | Urano | ..................... | H02J 5/005 |
| | | | | 307/104 |
| 2013/0207601 A1 | 8/2013 | Wu et al. | | |
| 2013/0271069 A1 | 10/2013 | Partovi | | |
| 2013/0285604 A1 | 10/2013 | Partovi | | |
| 2014/0084688 A1* | 3/2014 | Tzanidis | .................. | H02J 50/12 |
| | | | | 307/42 |
| 2014/0198544 A1* | 7/2014 | Tanaka | .............. | H02M 3/33538 |
| | | | | 363/55 |
| 2014/0319921 A1* | 10/2014 | Lisi | ................... | H02M 7/53803 |
| | | | | 307/104 |
| 2015/0061577 A1* | 3/2015 | Ye | ........................... | H02J 7/025 |
| | | | | 320/108 |

(Continued)

*Primary Examiner* — Adi Amrany
(74) *Attorney, Agent, or Firm* — Treyz Law Group, P.C.; George Victor Treyz; Jason Tsai

(57) ABSTRACT

Wireless power transmitting equipment has a wireless power transmitter that includes a power converter and a radio-frequency inverter. The radio-frequency inverter may have an output coupled to a transmitting coil circuit formed from a capacitor coupled in series with a wireless power transmitting coil. Feedback information such as information on an output voltage from a rectifier in wireless power receiving equipment is wirelessly transmitted to the wireless power transmitting equipment. Signal phase and amplitude information such as the rectifier output voltage, current measurements in the wireless power receiver, and current and voltage phase and amplitude measurements made using a voltage sensor across the radio-frequency inverter output and a current sensor in series with the transmitting coil circuit may be used by the wireless power transmitting equipment to control the wireless power transmitter and thereby adjust wireless power transmission levels.

20 Claims, 4 Drawing Sheets

(56) References Cited

U.S. PATENT DOCUMENTS

| | | | | |
|---|---|---|---|---|
| 2016/0013662 | A1* | 1/2016 | Wakabayashi | H02J 50/90 |
| | | | | 307/104 |
| 2016/0043566 | A1* | 2/2016 | Terao | H04B 5/0081 |
| | | | | 307/104 |
| 2016/0206799 | A1* | 7/2016 | Lucke | A61M 1/127 |
| 2016/0226296 | A1* | 8/2016 | Bae | H02J 5/00 |
| 2016/0241086 | A1* | 8/2016 | Jung | H02J 50/80 |
| 2016/0285316 | A1* | 9/2016 | Zhang | H02J 50/12 |
| 2016/0322868 | A1* | 11/2016 | Akuzawa | H02J 17/00 |
| 2016/0352147 | A1* | 12/2016 | Von Novak, III | H02J 50/12 |
| 2017/0005527 | A1* | 1/2017 | Ishihara | H02J 50/10 |
| 2017/0008385 | A1* | 1/2017 | Fujimoto | H02P 27/08 |
| 2017/0018973 | A1* | 1/2017 | Murayama | H02J 50/12 |
| 2017/0047784 | A1* | 2/2017 | Jung | G06F 1/26 |
| 2017/0093218 | A1* | 3/2017 | Hrinya | H02J 7/025 |
| 2017/0098965 | A1* | 4/2017 | Kikuchi | H02J 50/10 |
| 2017/0133860 | A1* | 5/2017 | Lee | H02J 50/12 |
| 2017/0187243 | A1* | 6/2017 | Sugiyama | H02J 7/007192 |
| 2017/0264141 | A1* | 9/2017 | Von Novak, III | H02J 50/50 |
| 2017/0305282 | A1* | 10/2017 | Obayashi | H02J 50/12 |
| 2017/0358952 | A1* | 12/2017 | Butler | E06B 3/04 |
| 2018/0159382 | A1* | 6/2018 | Lin | H02J 50/50 |
| 2018/0241301 | A1* | 8/2018 | Nagaoka | B60L 53/20 |
| 2018/0366984 | A1* | 12/2018 | Joye | H02J 7/025 |
| 2019/0058357 | A1* | 2/2019 | Du | H02J 50/00 |

* cited by examiner

WIRELESS POWER CONTROL SYSTEM

This application claims the benefit of provisional patent application No. 62/452,877, filed on Jan. 31, 2017, which is hereby incorporated by reference herein in its entirety.

FIELD

This relates generally to wireless systems, and, more particularly, to systems in which power is transferred wirelessly.

BACKGROUND

In a wireless power transfer system, a wireless power transmitting device such as charging mat may wirelessly transmit power to wireless power receiving equipment. The wireless power receiving equipment may use this power to charge a battery. During wireless power transfer operations, power transfer conditions may change. For example, magnetic coupling between transmitting and receiving coils may vary, which may potentially disrupt the wireless power transfer process.

SUMMARY

Wireless power transmitting equipment may transmit wireless power signals to wireless power receiving equipment. The wireless power transmitting equipment may have a transmitter that includes a power converter and a radio-frequency inverter. The radio-frequency inverter may have an output coupled to a transmitting coil circuit. The transmitting coil circuit may include a wireless power transmitting coil coupled in series with a capacitor. During operation, wireless power may be transmitted at a wireless power transmission level from the wireless power transmitting equipment to the wireless power receiving equipment.

The wireless power receiving equipment may have a rectifier coupled to a receiving coil circuit. The receiving coil circuit may have a wireless power receiving coil coupled in series with a capacitor. A rectifier may rectify signals from the receiving coil circuit to produce direct-current power. The wireless power receiving equipment may have a voltage sensor coupled to an output of the rectifier that gathers rectifier output voltage phase and amplitude information. The wireless power receiving equipment may also have a current sensor that measures rectifier output current phase and amplitude information. Feedback information such as the current and voltage phase and amplitude information that has been gathered in the wireless power receiving equipment may be wirelessly transmitted to the wireless power transmitting equipment for use in controlling the wireless power transmission level.

The wireless power transmitting equipment may have a voltage sensor and a current sensor for making signal phase and amplitude measurements. The voltage sensor may monitor the output of the radio-frequency inverter and the current sensor may be coupled in series with the transmitting coil circuit in the wireless power transmitting equipment to monitor transmitting coil circuit current. Control circuitry in the wireless power transmitting equipment may use current and voltage phase and amplitude measurements from the voltage and current sensors in the wireless power transmitting equipment and the feedback information from the wireless power receiving equipment in controlling the radio-frequency inverter and other transmitter circuitry in the wireless power transmitting equipment. The control circuitry may control the transmitter circuitry to adjust the wireless power transmission level between the wireless power transmitting equipment and the wireless power receiving equipment.

During operation, the wireless power transmitting equipment may sometimes be called upon to make relatively fast adjustments such as adjustments to accommodate load changes arising from load faults or other rapid load changes. The wireless power transmitting equipment may also be called upon to make slower changes such as those associated with component aging, temperature fluctuations, and fluctuations in electromagnetic coupling (coupling coefficient) between transmitting and receiving coils. The current and voltage measurements made in the wireless transmitting equipment can be used to produce feed forward information that is immediately available to help in controlling wireless power transmitter operation in response to rapid transients such as those associated with load changes. The current and voltage measurements made in the wireless receiving equipment can be used in producing accurate feedback information that is available to help in controlling wireless power transmitter operation in response to slower fluctuations such as those associated with temperature changes, changes in magnetic coupling, and component aging.

DETAILED DESCRIPTION

A wireless power transfer system may have wireless power transfer equipment such as wireless power transmitting equipment that transmits power and corresponding wireless power receiving equipment that receives wirelessly transmitted power.

The wireless power transmitting equipment may be equipment such as a wireless charging mat, wireless charging station, wireless charging puck, wireless charging stand, wireless charging table, or other wireless power transmitting equipment. The wireless power transmitting equipment may have one or more coils that are used in transmitting wireless power to wireless power receiving equipment. The wireless power receiving equipment may be an electronic device such as a portable electronic device, a vehicle, or other electronic equipment that receives wirelessly transmitted power.

During operation, the wireless power transmitting equipment may supply alternating-current signals to one or more wireless power transmitting coils. This causes the coils to transmit alternating-current electromagnetic signals (sometimes referred to as wireless power signals) to the wireless power receiving equipment. The wireless power receiving equipment may have one or more coils for receiving the transmitted wireless power signals.

Figure 1:
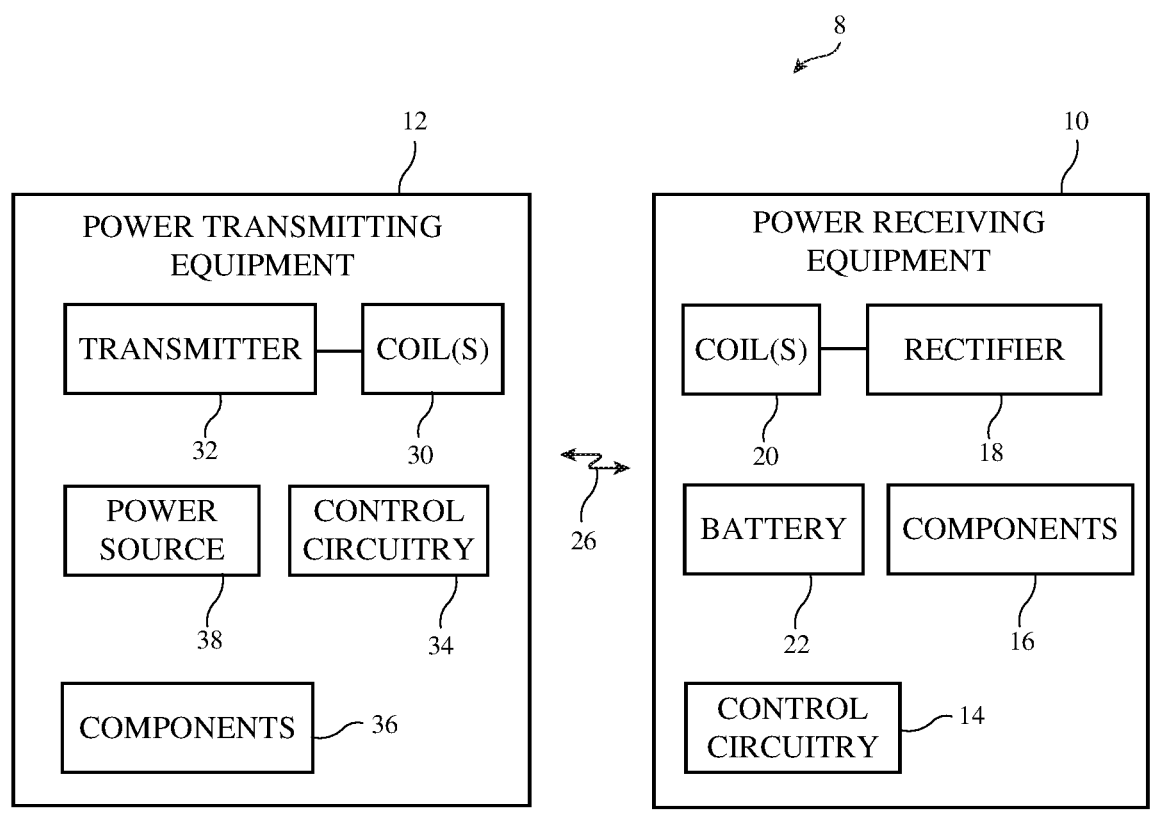
FIG. 1 is a schematic diagram of an illustrative wireless charging system in accordance with some embodiments.

An illustrative wireless power system (wireless charging system) is shown in FIG. 1. As shown in FIG. 1, wireless power system 8 may include wireless power transfer equipment such as wireless power transmitting equipment 12 and wireless power receiving equipment 10.

Power transmitting equipment 12 may be a mat, equipment built into a parking space, circuitry built into furniture or part of a vehicle, a charging stand, an electronic device such as a portable electronic device or desktop equipment, or may be other power transmitting equipment. For example, power transmitting equipment 12 may be a wireless charging mat or other wireless charger that rests under a vehicle during wireless charging. Equipment 10 may be a vehicle, an electronic device, or other wireless power receiving equipment.

Wireless power transmitting equipment 12 may have one or more power transmitting coils such as wireless power transmitting (wireless power transfer) coil(s) 30. Wireless power transmitter circuitry such as wireless power transmitter 32 may provide alternating current signals to coil(s) 30 that cause coil(s) 30 to emit electromagnetic fields 26 that are near-field coupled to corresponding wireless power receiving coil(s) 20 in wireless power receiving equipment 10. Rectifier 18 may rectify received signals from coil(s) 20 and may produce corresponding direct-current (DC) power for equipment 10.

Power transmitting equipment 12 may have a power source such as power source 38. Power source 38 may be a source of alternating-current (AC) voltage such as a wall outlet that supplies line power or other source of mains electricity or a source of direct-current voltage such as a battery. Power transmitting equipment 12 may have a power converter such as an AC-DC power converter for converting power from a mains power source or other power source into DC power. Power source 38 may be used to power control circuitry 34 and components 36 in equipment 12 and may be used to provide transmitter 32 with power to transmit to equipment 10. In equipment 10, power from rectifier 18 may be used to charge battery 22 and to power control circuitry 14 and components 16. Components 36 and 16 may include light-emitting components, displays, buttons, sensors, wireless communications circuitry, audio equipment and/or other input-output devices and components for supporting the operation of equipment 12 and/or 10. In some configurations, components 36 and 16 in equipment 10 and/or 12 may include motors, transmissions, steering systems, seating, body panels, doors and windows, and other vehicle components.

Control circuitry 34 and 14 may include storage and may include processing circuitry such as microprocessors, power management units, baseband processors, digital signal processors, microcontrollers, and/or application-specific integrated circuits with processing circuits. Control circuitry 34 and 14 may be configured to execute instructions for implementing desired control and communications features in system 8. For example, control circuitry 34 and/or 14 may be used in determining power transmission levels, processing sensor data, processing user input, processing other information such as information on wireless coupling efficiency from transmitting circuitry 32, processing information from wireless power receiving circuitry in equipment 10 such as rectifier 18, using information from sensors in components 16 and/or 36 to determine when to start and stop wireless charging operations, adjusting charging parameters such as charging frequencies, coil assignments in a multi-coil array, and wireless power transmission levels, and performing other control functions.

Control circuitry 34 and/or 14 may be configured to perform these operations using hardware (e.g., dedicated hardware or circuitry) and/or software (e.g., code that runs on the hardware of system 8). Software code for performing these operations may be stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media. Software stored on the non-transitory computer readable storage media may be executed on the processing circuitry of control circuitry 34 and/or 14. The processing circuitry may include application-specific integrated circuits with processing circuitry, one or more microprocessors, or other processing circuitry.

Control circuitry 34 and/or 14 may include wireless communications circuitry. If desired, circuitry 34 and 14 may include antennas and associated radio-frequency transceiver circuitry (e.g., circuitry operating at 2.4 GHz or other suitable communications frequencies). Circuitry 34 and/or 14 may also communicate wirelessly over the wireless link formed by signals 26. For example, control circuitry 14 may include a transmitter that is coupled across coil(s) 20. This transmitter may be used to modulate the impedance of coil(s) 20 to transmit data to equipment 10 as wireless signals 26 are being conveyed from equipment 12 to equipment 10 to transfer power wirelessly from equipment 12 to equipment 10. By modulating the impedance of coil(s) 20, a corresponding detectable change in the impedance of coil(s) 30 may be produced at equipment 12. A receiver in equipment 12 can detect these impedance changes at coil(s) 30 and can perform demodulation operations to recover the data transmitted from equipment 10.

Wireless data transmissions from equipment 10 to equipment 12 may be used to provide equipment 12 with feedback during wireless power transfer operations. If, as an example, changes in the operating environment of system 8 give rise to changes in the wireless power transfer operations for system 8, equipment 10 may provide wireless feedback signals to equipment 12 that inform equipment 12 of the changes. Measured fluctuations in rectifier output voltage and current may, for example, be conveyed wirelessly to equipment 12. This allows equipment 12 to make corrective adjustments to the wireless power signals being transmitted from equipment 10 and 12. Wireless feedback information may be provided from equipment 10 to equipment 12 by using a transmitter and antenna in control circuitry 14 to transmit wireless data to a corresponding antenna and receiver in control circuitry 34 or may be provided by using a transmitter in circuitry 14 to modulate the impedance of coil 20 and thereby wirelessly transmit data to coil 30 and an associated receiver in control circuitry 34.

Regardless of the type of wireless communications arrangement that is used to wirelessly convey wireless power transfer feedback information from equipment 10 to equipment 12, such communications may have an associated latency. This latency can potentially limit the speed with which control circuitry 34 can make changes to the operation of wireless power transmitting equipment 12. To overcome control speed limitations associated with latency in wirelessly receiving feedback information from equipment 10, system 8 can use a hybrid control technique in which control decisions are based on both on wirelessly received feedback information from equipment 10 and more direct locally gathered real-time information from sensor circuitry in equipment 12. Locally gathered information from the sensor circuitry in equipment 12 may serve as feed-forward information that can help control circuitry 34 act promptly to changed operating conditions. With one illustrative configuration, control circuitry 34 in equipment 12 can dynamically adjust the operation of equipment 12 based on both the feed-forward information gathered from the sensors of equipment 12 (which exhibits low latency) and feedback information from equipment 10 (which accurately reflects the output of rectifier 18).

Figure 2:
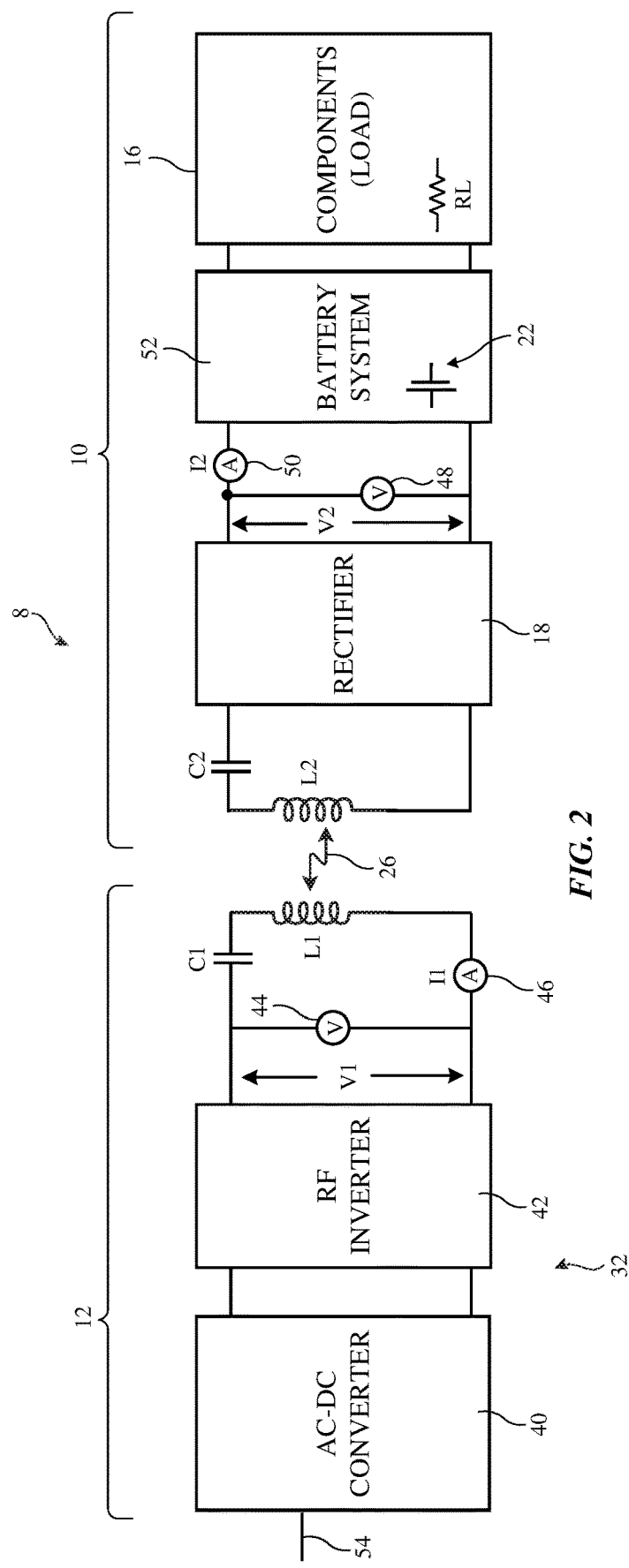
FIG. 2 is a schematic diagram of illustrative wireless charging system circuitry in accordance with an embodiment.

FIG. 2 is a circuit diagram showing circuitry for system 8 that allows equipment 12 to be controlled using both wirelessly received feedback from equipment 10 and real-time measurements of parameters associated with the operation of transmitter 32 and coil(s) 30. Equipment 12 may, for example, receive information on the current and output voltage being delivered by rectifier 18 in equipment 10 wirelessly from equipment 10, while making real-time measurements of the current and voltage associated with transmitting wireless power using transmitter 32 and coil(s) 30. The wirelessly received information from equipment 10 may be used to provide feedback information and the information measured in equipment 12 may be used to provide feed-forward information. Both the feed-forward and feedback information may be used by equipment 12 in dynamically adjusting the wireless transfer of power from equipment 12 to equipment 10.

As shown in FIG. 2, equipment 12 may receive power from power source 38 at input 54. The received power may be, for example, mains power from an alternating current source. Alternating-current (AC) power may be converted to direct-current (DC) power using AC-DC converter 40. Radio-frequency inverter 42 may create a radio-frequency drive signal from DC-power (DC voltage) received from converter 40. The radio-frequency drive signal may be, for example, a signal at 85 kHz, at 10-300 kHz, at more than 50 kHz, at less than 200 kHz, or other suitable frequency. This alternating current drive signal may be supplied to a transmitting coil circuit formed from capacitor C1 and coil L1, which causes the transmitting coil circuit to emit alternating-current magnetic fields (fields 26). Inverter 42 may, for example, have a pair of output terminals coupled to capacitor C1 and an appropriate one or more of coils 30 such as wireless power transfer coil (inductor) L1. Equipment 12 may have monitoring circuitry such as voltage sensor 44 and current sensor 46. Voltage sensor 44 may be coupled between the output terminals of inverter 42 and current sensor 46 may be coupled in series with the transmitting coil circuit formed from capacitor C1 and coil L1. Control circuitry 34 may use real-time measurements from the monitoring circuitry in equipment 12 and wirelessly received feedback information from equipment 10 in controlling equipment 12 (e.g., in controlling converter 40 and/or inverter 42).

Coil L1 may be magnetically coupled to wireless power transfer coil L2 in equipment 10. Coil L2 may be coupled in series with capacitor C2 to form a receiving coil circuit in equipment 10. Coil L1 and capacitor C1 may form a transmitting coil circuit in equipment 12 that is used in generating wireless power signals 26. Coil L2 and capacitor C2 may form a corresponding receiving coil circuit in equipment 10 that is used in receiving signals 26.

During operation, magnetic coupling between coils L1 and L2 may allow power (signals 26) to be transferred wirelessly from equipment 12 to equipment 10. Rectifier 18 in equipment 10 may convert alternating-current signals in the receiving coil circuit formed from coil L2 and capacitor C2 into direct-current output voltage V2 and associated direct-current output current I2. Voltage V2 may be used to power loads in equipment 10 such as battery system 52 (e.g., a battery charging circuit that controls charging of battery 22 using voltage V2) and components 16.

Equipment 10 may have monitoring circuitry such as circuitry 48 and 50. Circuitry 48 may be a voltage sensor that measures rectifier output voltage V2. Circuitry 50 may be a current sensor that measures rectifier output current I2.

Figure 3:
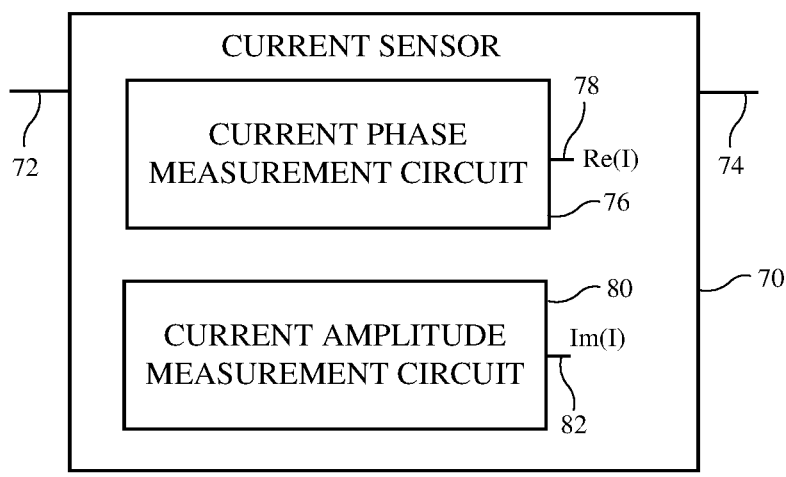
FIG. 3 is a diagram of illustrative current sensing equipment in accordance with an embodiment.

FIG. 3 is a diagram of illustrative current sensor circuitry for use in the monitoring circuitry of equipment 12 and/or 10. Current sensor 70 may, for example, be used to implement current sensor circuitry 46 of equipment 12 and/or current sensor circuitry 50 of equipment 10. As shown in FIG. 3, current sensor 70 may measure current flowing between terminals 72 and 74. Current sensor 70 may include circuitry for making current phase measurements such as current phase measurement circuit 76, which produces current phase information (the real part of the current being measured) at output 78. Current sensor 70 may also include circuitry for making current amplitude measurements such as current amplitude measurement circuit 80, which produces current amplitude information (the imaginary part of the current being measured) at output 82.

Figure 4:
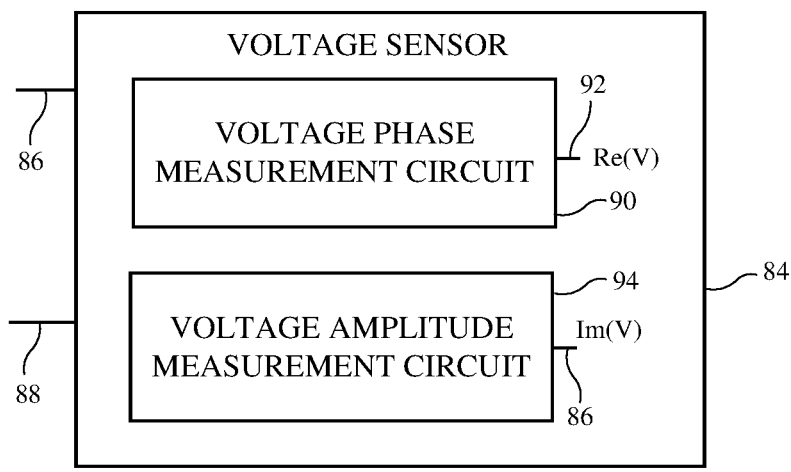
FIG. 4 is a diagram of illustrative voltage sensing equipment in accordance with an embodiment.

FIG. 4 is a diagram of illustrative voltage sensor circuitry for use in the signal monitoring circuitry of equipment 12 and/or 10. The circuitry of voltage sensor 84 of FIG. 4 may be used in voltage sensor circuitry 44 of equipment 12 and/or voltage sensor circuitry 48 of equipment 10. As shown in FIG. 4, voltage sensor 84 may measure voltage across terminals 86 and 88. Voltage sensor 84 may include circuitry for making voltage phase measurements such as voltage phase measurement circuit 90, which produces voltage phase information (the real part of the voltage being measured) at output 92. Voltage sensor 84 may also include circuitry for making voltage amplitude measurements such as voltage amplitude measurement circuit 94, which produces voltage amplitude information (the imaginary part of the voltage being measured) at output 96.

During operation of system 8, signal monitoring circuitry in system 8 may be used to measure I1, V1, I2, and V2. I2 and V2 may be wirelessly transmitted from equipment 10 to equipment 10.

The impedance of the transmitting coil circuit formed from coil L1 and capacitor C1 may be determined (e.g., by control circuitry 34) using equation 1.1, where $R_{L1}$ is the series resistance of coil L1.

$$Z1 = j\omega L1 - 1/j\omega C1 + R_{L1} \qquad (1.1)$$

The impedance of the receiving coil circuit formed from coil L2 and capacitor C2 may be determined (e.g., by control circuitry 34) using equation 1.2, where $R_{L2}$ is the series resistance of coil L2.

$$Z2 = j\omega L2 - 1/j\omega C2 + R_{L2} \qquad (1.2)$$

Coupling M between coils L1 and L2 may then be determined (e.g., by control circuitry 34) using equation 1.3.

$$M = (1/\omega) * [|(V2/I2 + Z2)(V1/I1 - Z1)|]^{1/2} \qquad (1.3)$$

Control circuitry 34 may also use equations 2.1-2.3 to determine the values of additional parameters that characterize the performance of system 8.

$$Pout = \text{Real}[V1 * I1] \qquad (2.1)$$

$$R_L = \omega^2 M^2/(V1/I1-Z1)-Z2 \quad (2.2)$$

$$V2 = [Pout*R_L]^{1/2} \quad (2.3)$$

The value of Pout from equation 2.1 represents the power delivered to equipment 12 from equipment 10 and may be used as a low-latency feed-forward element in controlling wireless power delivery to equipment 10. In equation 2.2, the last known value of M (based on I2 and V2 information transmitted wirelessly from equipment 10 to equipment 12) may be used in computing $R_L$. The value of $R_L$ in equation 2.2 represents the effective load resistance of the load of equipment 10 and may be used by control circuitry 34 and/or 14 in detecting fault conditions (e.g., $R_L$ may be monitored over time to determine whether the value of $R_L$ has drifted out of an expected range). If a fault condition is detected, power delivery to equipment 10 can be reduced or other suitable actions taken. Voltage V2 in equation 2.3 is a derived value that is obtained from the known values of Pout and $R_L$ from equations 2.1 and 2.2 and represents the rectifier output voltage in equipment 10.

Figure 5:
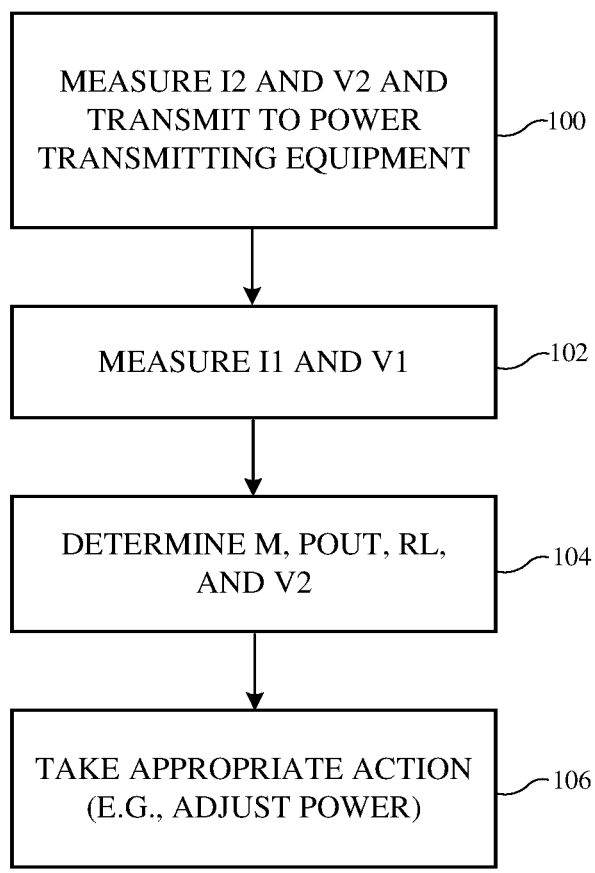
FIG. 5 is a flow chart of illustrative operations involved in controlling a wireless charging system in accordance with an embodiment.

Illustrative operations involved in controlling system 8 during wireless power transfer operations are shown in the flow chart of FIG. 5.

During the operations of block 100, control circuitry 14 of equipment 10 may use current sensor 50 to measure current I2 and may use voltage sensor 48 to measure voltage V2. The measured values of I2 and V2 may be transmitted wirelessly from equipment 10 to equipment 12.

During the operations of block 102, control circuitry 34 of equipment 12 may use current sensor 46 to measure current I1 and may use voltage sensor 44 to measure voltage V1. Phase and amplitude measurements may be made when measuring the voltages and currents of blocks 100 and 102.

During the operations of block 104, equations 1.1, 1.2, 1.3, 2.1, 2.2, and 2.3 may be used to determine operating parameters of interest for system 8 (e.g., M, Pout, $R_L$, and V2).

System 8 may then take appropriate action based on the information that has been gathered (block 106). For example, control circuitry 34 may use feedback information such as the measured value of rectifier output voltage V2 to determine whether V2 is too high or too low. If the value of V2 is too low, battery system 52 may not be able to charge battery 22 effectively, so control circuitry 34 can adjust inverter 42 and/or converter 40 to increase power delivery in response to measuring low values of V2. Signal measurements make locally with sensors 44 and 46 may be used to provide a feed forward element to the control scheme implemented by control circuitry 12. As an example, because the value of Pout measured from equation 2.1 is computed at least partly based on the measured values of I1 and V1 (which are not affected by wireless transmission latency between equipment 10 and 12), the measured value of Pout may be effectively used as a feed forward element that adds a faster (low latency) contribution to the feedback provided by monitoring voltage V2. If desired, adjustments may be made immediately upon measuring feed forward information I1 and V1 at block 102 and additional adjustments may be made periodically when feedback information is available (e.g., from measurements of the type made in block 100). The flow of operations depicted in FIG. 5 is illustrative.

The measured value of RL and/or other information gathered using sensors 48, 50, 44, and/or 46 (e.g., M, V2, Pout, etc.) may be used to help detect potential fault conditions. In response to detection of a potential fault, control circuitry 12 may supply control signals to converter 40 and/or inverter 42 to reduce (e.g., to temporarily lower or to completely halt) the delivery of wireless power to equipment 10. Control circuitry 14 may also take actions in response to detection of potential fault conditions (e.g., by switching on protection circuitry, by adjusting battery system 52 and/or other power regulator circuitry in equipment 10, etc.). In general, control circuitry 14 may adjust the wireless power transmission level for equipment 12 based on signal phase and amplitude information (e.g., feed forward voltage and current information gathered using sensors 44 and 46 and feedback voltage and current information gathered using sensors 48 and 50) and/or any other suitable information gathered using the sensors and other circuitry in system 8.

The foregoing is merely illustrative and various modifications can be made to the described embodiments. The foregoing embodiments may be implemented individually or in any combination.

What is claimed is:

1. Wireless power transfer equipment, comprising:
   a transmitting coil circuit comprising a wireless power transfer coil and a capacitor;
   a radio-frequency inverter that is coupled to the transmitting coil circuit and that is configured to provide alternating-current signals to the transmitting coil circuit, wherein the transmitting coil circuit is configured to transmit wireless power at a wireless power transmission level to wireless power receiving equipment that is movable relative to the wireless power transfer coil when provided with the alternating-current signals;
   signal monitoring circuitry coupled to the transmitting coil circuit and configured to gather a signal phase measurement and a signal amplitude measurement; and
   control circuitry configured to, while the wireless power receiving equipment is powering a load at the wireless power receiving equipment using the transmitted wireless power:
      receive the signal phase measurement and the signal amplitude measurement from the signal monitoring circuitry,
      receive, using the wireless power transfer coil, wirelessly transmitted feedback information from the wireless power receiving equipment,
      control the radio-frequency inverter to perform a first adjustment of the wireless power transmission level based on the signal phase measurement and the signal amplitude measurement, and
      once the feedback information is available at the control circuitry, control the radio-frequency inverter to perform a second adjustment of the wireless power transmission level by computing a parameter that is a function of the feedback information and the signal phase measurement and signal amplitude measurement, wherein the second adjustment is subsequent to the first adjustment.

2. The wireless power transfer equipment defined in claim 1 wherein the radio-frequency inverter has first and second output terminals and wherein the signal monitoring circuitry includes a voltage sensor coupled across the first and second output terminals.

3. The wireless power transfer equipment defined in claim 2 wherein the signal monitoring circuitry comprises a current sensor coupled in series with the wireless power transfer coil.

4. The wireless power transfer equipment defined in claim 3 wherein the voltage sensor comprises:
   a voltage phase measurement circuit configured to supply a voltage phase measurement; and a voltage amplitude measurement circuit configured to supply a voltage amplitude measurement.

5. The wireless power transfer equipment defined in claim 4 wherein the current sensor comprises:
a current phase measurement circuit configured to supply a current phase measurement; and
a current amplitude measurement circuit configured to supply a current amplitude measurement.

6. The wireless power transfer equipment defined in claim 5 wherein the feedback information includes wirelessly transmitted information on current phase and amplitude associated with a rectifier of the wireless power receiving equipment and voltage phase and amplitude associated with the rectifier of the wireless power receiving equipment.

7. The wireless power transfer equipment defined in claim 6 further comprising an alternating-current-to-direct-current converter configured to supply direct-current power to the radio-frequency inverter.

8. The wireless power transfer equipment defined in claim 1 wherein the control circuitry is configured to determine a load resistance of wireless power receiving equipment that receives wirelessly transmitted power from the transmitting coil circuit.

9. The wireless power transfer equipment defined in claim 8 wherein the control circuitry is configured to determine the load resistance based at least partly on the signal phase measurement and the signal amplitude measurement.

10. The wireless power transfer equipment defined in claim 9 wherein the signal phase measurement and the signal amplitude measurement include current phase and amplitude information for current signals passing through the wireless power transfer coil and wherein the signal phase measurement and the signal amplitude measurement includes voltage phase and amplitude information associated with an output of the radio-frequency inverter.

11. The wireless power transfer equipment defined in claim 1, wherein the feedback information includes rectifier output current information associated with a rectifier in the wireless power receiving equipment and rectifier output voltage information associated with the rectifier in the wireless power receiving equipment and wherein the control circuitry is further configured to:
determine a last known coupling value between the transmitting coil circuit and the wireless power receiving equipment based on a last known rectifier output voltage, a last known rectifier output current, and the signal phase and amplitude information; and
control the radio-frequency inverter to adjust the wireless power transmission level based at least partly on the last known coupling value.

12. The wireless power transfer equipment defined in claim 1, wherein the wirelessly transmitted feedback information comprises a first voltage value and a first current value generated by the wireless power receiving equipment, wherein the signal phase measurement and the signal amplitude measurement comprise a second voltage value and a second current value gathered by the signal monitoring circuitry, and wherein the control circuitry is further configured to:
generate a coupling value as a function proportional to a square root of the first voltage value multiplied by the second voltage value and divided by the first current value and the second current value; and
control the radio-frequency inverter to perform the second adjustment based on the generated coupling value.

13. Wireless power transmitting equipment, comprising:
a wireless power transmitting coil;
a wireless power transmitter circuit coupled to the wireless power transmitting coil and configured to provide alternating-current signals to the wireless power transmitting coil, wherein the wireless power transmitting coil is configured to wirelessly transmit power at a wireless power transmission level to wireless power receiving equipment when provided with the alternating-current signals, wherein the wireless power receiving equipment is movable relative to the wireless power transmitting coil;
signal monitoring circuitry coupled to the wireless power transmitting coil that is configured to gather signal phase and amplitude measurements; and
control circuitry configured to, while the wireless power receiving equipment is powering a load at the wireless power receiving equipment using the transmitted wireless power:
receive, using the wireless power transmitting coil, wirelessly transmitted feedback information from the wireless power receiving equipment,
control the wireless power transmitter circuit to perform a first adjustment of the wireless power transmission level based on the signal phase and amplitude measurements, and
control the wireless power transmitter circuit to perform a second adjustment of the wireless power transmission level by computing a value dependent on the feedback information and the signal phase and amplitude measurements, wherein the second adjustment is subsequent to the first adjustment.

14. The wireless power transmitting equipment defined in claim 13 further comprising a capacitor coupled in series with the wireless power transmitting coil that forms a transmitting coil circuit, wherein the wireless power transmitter circuit comprises a radio-frequency inverter coupled to the transmitting coil circuit.

15. The wireless power transmitting equipment defined in claim 14 wherein the radio-frequency inverter has first and second output terminals coupled to the transmitting coil circuit and wherein the signal monitoring circuitry comprises a voltage sensor coupled between the first and second output terminals.

16. The wireless power transmitting equipment defined in claim 15 wherein the signal monitoring circuitry comprises a current sensor coupled in series with the wireless power transmitting coil.

17. Wireless power transmitting equipment, comprising:
a transmitting coil circuit comprising a wireless power transfer coil and a capacitor;
a radio-frequency inverter that has an output that is coupled to the transmitting coil circuit and that is configured to provide alternating-current signals to the transmitting coil circuit, wherein the transmitting coil circuit is configured to transmit wireless power at a wireless power transmission level when the alternating-current signals are provided to the transmitting coil circuit;
a current sensor;
a voltage sensor; and
control circuitry configured to:
gather a current measurement from the current sensor and a voltage measurement from the voltage sensor,
receive wirelessly transmitted information associated with a rectifier output voltage from wireless power receiving equipment that is movable relative to the wireless power transfer coil and that has a load that is powered by the wireless power, compute an effective load resistance of the load of the wireless power receiving equipment as a function of the wirelessly transmitted information, the current measurement, and the voltage measurement, and detect a fault condition associated with the wireless power receiving equipment based on the computed effective load resistance.

18. The wireless power transmitting equipment defined in claim 17 wherein the current sensor comprises:

a current phase measurement circuit configured to supply a current phase measurement to the control circuitry; and a current amplitude measurement circuit configured to supply a current amplitude measurement to the control circuitry.

19. The wireless power transmitting equipment defined in claim 18 wherein the voltage sensor comprises:

a voltage phase measurement circuit configured to supply a voltage phase measurement to the control circuitry; and a voltage amplitude measurement circuit configured to supply a voltage amplitude measurement to the control circuitry, wherein the voltage sensor is coupled to the output of the radio-frequency inverter and wherein the current sensor is coupled in series with the transmitting coil circuit.

20. The wireless power transmitting equipment defined in claim 17, wherein the function is inversely proportional to the voltage measurement and directly proportional to a square of a coupling value, and wherein the control circuitry is further configured to:

compute the coupling value as an additional function that is directly proportional to a square root of the voltage measurement divided by the current measurement, wherein the additional function is directly proportional to a square root of an additional voltage measurement from the wirelessly transmitted information divided by an additional current measurement from the wirelessly transmitted information.

\* \* \* \* \*